United States Patent
Li et al.

(10) Patent No.: US 12,546,217 B2
(45) Date of Patent: Feb. 10, 2026

(54) MACHINE-LEARNING BASED RIG-SITE ON-DEMAND DRILLING MUD CHARACTERIZATION, PROPERTY PREDICTION, AND OPTIMIZATION

(71) Applicant: Saudi Arabian Oil Company, Dhahran (SA)

(72) Inventors: Weichang Li, Katy, TX (US); Ashok Santra, The Woodlands, TX (US); Miguel Gonzalez, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 1092 days.

(21) Appl. No.: 17/551,959

(22) Filed: Dec. 15, 2021

(65) Prior Publication Data

US 2023/0184107 A1    Jun. 15, 2023

(51) Int. Cl.
*G06F 30/20* (2020.01)
*E21B 49/00* (2006.01)
*G06N 20/20* (2019.01)

(52) U.S. Cl.
CPC .......... *E21B 49/005* (2013.01); *G06N 20/20* (2019.01); *E21B 2200/20* (2020.05); *E21B 2200/22* (2020.05)

(58) Field of Classification Search
CPC .............. E21B 49/005; E21B 2200/20; E21B 2200/22; G06N 20/20
USPC ..................................................... 703/9, 10
See application file for complete search history.

(56) References Cited

U.S. PATENT DOCUMENTS

| | | | |
|---|---|---|---|
| 2014/0090896 A1* | 4/2014 | Wagle | C09K 8/34 507/139 |
| 2014/0116776 A1* | 5/2014 | Marx | E21B 12/02 706/11 |
| 2019/0226336 A1* | 7/2019 | Benson | E21B 49/0875 |
| 2020/0285216 A1* | 9/2020 | Elyas | G06N 20/00 |

OTHER PUBLICATIONS

Akinade et al., "Improving The Rheological Properties of Drilling Mud Using Local Based Materials," American Journal of Engineering Research, Jan. 2018, 7 pages.

(Continued)

*Primary Examiner* — Andre Pierre Louis
(74) *Attorney, Agent, or Firm* — Fish & Richardson P.C.

(57) ABSTRACT

A computer-implemented method for machine learning based rig-site on-demand drilling mud characterization, property prediction and optimization is described. The method includes predicting rheological properties of drilling mud from compositional data based on a first empirical relationship across the compositional data. The method also includes predicting sensor based rheological performance of drilling mud based on a second relationship between the predicted rheological properties of the drilling mud and sensor responses from one or more sensors. Additionally, the method includes providing feedback to the one or more sensors, wherein the feedback comprises the sensor based rheological performance, sensor responses, and a formulation associated with the drilling mud, wherein the feedback enables updating the formulation associated with the drilling mud.

20 Claims, 14 Drawing Sheets

(56) References Cited

OTHER PUBLICATIONS

Al-Hameedi et al., "Mud loss estimation using machine learning approach," Journal of Petroleum Exploration and Production Technology, Jun. 2019, 9:2 (1339-1354), 16 pages.

Alsaihati et al., "Real-Time Prediction of Equivalent Circulation Density for Horizontal Wells Using Intelligent Machines," ACS Omega., Jan. 2021, 6:1 (934-942), 9 pages.

Anoop et al. "Viscosity measurement dataset for a water-based drilling mud-carbon nanotube suspension at high-pressure and high-temperature," Data in Brief, Jun. 2019, 24: 103816, 5 pages.

Beck et al., "The Effect of Rheology on Rate of Penetration," SPE/IADC 29368, Society of Petroleum Engineers (SPE), Drilling Conference, Jan. 1995, 9 pages.

Bég et al., "Experimental study of improved rheology and lubricity of drilling fluids enhanced with nano-particles," Applied Nanoscience, Jun. 2018, 8:5 (1069-1090), 22 pages.

Gowida et al., "Data-Driven Framework to Predict the Rheological Properties of CaCl2 Brine-Based Drill-in Fluid Using Artificial Neural Network," Energies, 2019, 12: 1880, 33 pages.

\* cited by examiner

| 402 → Chemical | Water[mL] | Bentonite[g] | Bentone[g] | Barite[g] | EDC 95/11[g] | Escaid 120 ULA[g] | One-Mul[g] |
|---|---|---|---|---|---|---|---|
| WBM_Ref | 350.0 | 10.0 | 0.0 | 150.0 | 0.0 | 0.0 | 0.0 |
| WBM_Ref + 0.2 g LS | 350.0 | 10.0 | 0.0 | 150.0 | 0.0 | 0.0 | 0.0 |
| WBM_Ref + 0.3 g LS | 350.0 | 10.0 | 0.0 | 150.0 | 0.0 | 0.0 | 0.0 |
| WBM_Ref + 0.4 g LS | 350.0 | 10.0 | 0.0 | 150.0 | 0.0 | 0.0 | 0.0 |
| WBM_Ref + 0.5 g LS | 350.0 | 10.0 | 0.0 | 150.0 | 0.0 | 0.0 | 0.0 |
| WBM_Ref + 0.6 g LS | 350.0 | 10.0 | 0.0 | 150.0 | 0.0 | 0.0 | 0.0 |
| WBM_Ref + 0.7 g LS | 350.0 | 10.0 | 0.0 | 150.0 | 0.0 | 0.0 | 0.0 |
| WBM_Ref + 0.8 g LS | 350.0 | 10.0 | 0.0 | 150.0 | 0.0 | 0.0 | 0.0 |
| WBM_Ref + 0.9 g LS | 350.0 | 10.0 | 0.0 | 150.0 | 0.0 | 0.0 | 0.0 |
| WBM_Ref + 1.0 g LS | 350.0 | 10.0 | 0.0 | 150.0 | 0.0 | 0.0 | 0.0 |
| WBM_Ref + 2.0 g LS | 350.0 | 10.0 | 0.0 | 150.0 | 0.0 | 0.0 | 0.0 |
| OBM_EDC90/10 + 0.5 g poly acrylic | 67.9 | 0.0 | 7.0 | 1095.9 | 498.4 | 0.0 | 25.0 |
| OBM_EDC90/10 + 1.0 g poly acrylic | 67.9 | 0.0 | 7.0 | 1095.9 | 498.4 | 0.0 | 25.0 |
| OBM_EDC90/10 + 1.5 g poly acrylic | 67.9 | 0.0 | 7.0 | 1095.9 | 498.4 | 0.0 | 25.0 |
| OBM_60/40 | 305.0 | 0.0 | 12.0 | 677.0 | 0.0 | 373.0 | 20.0 |
| OBM_70/30 | 228.0 | 0.0 | 12.0 | 709.0 | 0.0 | 436.0 | 20.0 |
| OBM_80/20 | 151.0 | 0.0 | 12.0 | 746.0 | 0.0 | 497.0 | 20.0 |
| OBM_90/10 | 71.0 | 0.0 | 12.0 | 783.0 | 0.0 | 559.0 | 20.0 |

| Lime[g] | Versatrol[g] | CaCl2[g] | Salt[g] | Poly Actylic[g] | DUO-VIS[g] | Soda Ash[g] | Lignosulfonates[g] |
|---|---|---|---|---|---|---|---|
| 0.0 | 0.0 | 0.0 | 0.0 | 0.000 | 0.6 | 4.0 | 0.0 |
| 0.0 | 0.0 | 0.0 | 0.0 | 0.000 | 0.6 | 4.0 | 0.2 |
| 0.0 | 0.0 | 0.0 | 0.0 | 0.000 | 0.6 | 4.0 | 0.3 |
| 0.0 | 0.0 | 0.0 | 0.0 | 0.000 | 0.6 | 4.0 | 0.4 |
| 0.0 | 0.0 | 0.0 | 0.0 | 0.000 | 0.6 | 4.0 | 0.5 |
| 0.0 | 0.0 | 0.0 | 0.0 | 0.000 | 0.6 | 4.0 | 0.6 |
| 0.0 | 0.0 | 0.0 | 0.0 | 0.000 | 0.6 | 4.0 | 0.7 |
| 0.0 | 0.0 | 0.0 | 0.0 | 0.000 | 0.6 | 4.0 | 0.8 |
| 0.0 | 0.0 | 0.0 | 0.0 | 0.000 | 0.6 | 4.0 | 0.9 |
| 0.0 | 0.0 | 0.0 | 0.0 | 0.000 | 0.6 | 4.0 | 1.0 |
| 0.0 | 0.0 | 0.0 | 0.0 | 0.000 | 0.6 | 4.0 | 2.0 |
| 25.0 | 10.0 | 0.0 | 20.9 | 2.975 | 0.0 | 0.0 | 0.0 |
| 25.0 | 10.0 |  | 20.9 | 5.775 | 0.0 | 0.0 | 0.0 |
| 25.0 | 10.0 | 0.0 | 20.9 | 8.751 | 0.0 | 0.0 | 0.0 |
| 20.0 | 10.0 | 88.0 | 0.0 | 0.000 | 0.0 | 0.0 | 0.0 |
| 20.0 | 10.0 | 66.0 | 0.0 | 0.000 | 0.0 | 0.0 | 0.0 |
| 20.0 | 10.0 | 44.0 | 0.0 | 0.000 | 0.0 | 0.0 | 0.0 |
| 20.0 | 10.0 | 22.0 | 0.0 | 0.000 | 0.0 | 0.0 | 0.0 |

| Chemical | TAU_fp[Pa] | TAU_ys[Pa] | GAMMA_ys[%] | G=G[Pa] |
|---|---|---|---|---|
| WBM_Ref | 10.540 | 4.0900 | 3.0000 | 17.25 |
| WBM_Ref + 0.2 g LS | 8.570 | 2.8800 | 2.7000 | 10.47 |
| WBM_Ref + 0.3 g LS | 7.040 | 1.5700 | 2.1000 | 8.16 |
| WBM_Ref + 0.4 g LS | 6.110 | 1.1400 | 2.0000 | 6.77 |
| WBM_Ref + 0.5 g LS | 5.660 | 0.4200 | 0.8000 | 6.20 |
| WBM_Ref + 0.6 g LS | 4.350 | 0.7900 | 1.9000 | 3.91 |
| WBM_Ref + 0.7 g LS | 3.760 | 0.5600 | 1.8900 | 3.22 |
| WBM_Ref + 0.8 g LS | 3.840 | 0.5300 | 1.5600 | 3.37 |
| WBM_Ref + 0.9 g LS | 3.570 | 0.4000 | 0.5500 | 3.05 |
| WBM_Ref + 1.0 g LS | 3.760 | 0.7300 | 1.8000 | 4.58 |
| WBM_Ref + 2.0 g LS | 2.720 | 0.0100 | 0.1500 | 2.46 |
| OBM_EDC90/10 + 0.5 g poly acrylic | 0.048 | 0.0019 | 0.0202 | 5.20 |
| OBM_EDC90/10 + 1.0 g poly acrylic | 0.033 | 0.0012 | 0.0197 | 3.77 |
| OBM_EDC90/10 + 1.5 g poly acrylic | 0.003 | 0.0017 | 0.0268 | 4.75 |
| OBM_60/40 | 1.081 | 0.4000 | 0.1900 | 82.00 |
| OBM_70/30 | 0.231 | 0.1100 | 0.0900 | 37.10 |
| OBM_80/20 | 0.631 | 0.1300 | 0.1700 | 27.90 |
| OBM_90/10 | 2.748 | 0.2300 | 0.5500 | 6.00 |

FIG. 5

|   | train-rmse-mean | train-rmse-std | test-rmse-mean | test-rmse-std |
|---|---|---|---|---|
| 0 | 4.056399 | 0.209011 | 3.488040 | 2.161397 |
| 1 | 3.833624 | 0.194897 | 3.280913 | 2.085592 |
| 2 | 3.632978 | 0.181567 | 3.090874 | 2.021182 |
| 3 | 3.454123 | 0.170278 | 2.922082 | 1.963964 |
| 4 | 3.293126 | 0.160201 | 2.767454 | 1.913587 |

MACHINE-LEARNING BASED RIG-SITE ON-DEMAND DRILLING MUD CHARACTERIZATION, PROPERTY PREDICTION, AND OPTIMIZATION

TECHNICAL FIELD

This disclosure relates generally to machine-learning based rig-site on-demand drilling mud characterization, property prediction, and optimization.

BACKGROUND

Drilling mud is injected into the wellbore to facilitate the drilling process by suspending cuttings, controlling pressure, stabilizing exposed rock, providing buoyancy, cooling, and lubricating. In some cases, the drilling mud transports cuttings away from the drillbit. The particular composition of drilling mud can maximize recovery and minimize the amount of time it takes to achieve first oil.

SUMMARY

An embodiment described herein provides a method for machine learning based rig-site on-demand drilling mud characterization, property prediction and optimization. The method includes predicting rheological properties of drilling mud from compositional data based on a first empirical relationship across the compositional data, wherein the compositional data comprises multiple material mud properties. The method also includes predicting sensor based rheological performance of drilling mud based on a second relationship between the predicted rheological properties of the drilling mud and sensor responses from one or more sensors, wherein sensor-based rheological performance comprises a behavior of the drilling mud at the sensor responses. Additionally, the method includes providing feedback to the one or more sensors, wherein the feedback comprises the sensor based rheological performance, sensor responses, and a formulation associated with the drilling mud, wherein the feedback enables updating the formulation associated with the drilling mud.

An embodiment described herein provides an apparatus comprising a non-transitory, computer readable, storage medium that stores instructions that, when executed by at least one processor, cause the at least one processor to perform operations. The operations include predicting rheological properties of drilling mud from compositional data based on a first empirical relationship across the compositional data, wherein the compositional data comprises multiple material mud properties. The operations also include predicting sensor based rheological performance of drilling mud based on a second relationship between the predicted rheological properties of the drilling mud and sensor responses from one or more sensors, wherein sensor-based rheological performance comprises a behavior of the drilling mud at the sensor responses. Additionally, the operations include providing feedback to the one or more sensors, wherein the feedback comprises the sensor based rheological performance, sensor responses, and a formulation associated with the drilling mud, wherein the feedback enables updating the formulation associated with the drilling mud.

An embodiment described herein provides a system. The system comprises one or more memory modules and one or more hardware processors communicably coupled to the one or more memory modules. The one or more hardware processors is configured to execute instructions stored on the one or more memory models to perform operations. The operations include predicting rheological properties of drilling mud from compositional data based on a first empirical relationship across the compositional data, wherein the compositional data comprises multiple material mud properties. The operations also include predicting sensor based rheological performance of drilling mud based on a second relationship between the predicted rheological properties of the drilling mud and sensor responses from one or more sensors, wherein sensor-based rheological performance comprises a behavior of the drilling mud at the sensor responses. Additionally, the operations include providing feedback to the one or more sensors, wherein the feedback comprises the sensor based rheological performance, sensor responses, and a formulation associated with the drilling mud, wherein the feedback enables updating the formulation associated with the drilling mud.

BRIEF DESCRIPTION OF DRAWINGS

FIGS. 4A-4B are a chart with exemplary composition properties of drilling mud samples.

FIG. 5 is a chart with exemplary target rheological properties of several drilling mud samples.

FIG. 7 is a chart with exemplary k-fold cross-validation performance results for flow point prediction.

DETAILED DESCRIPTION

Figure 1:
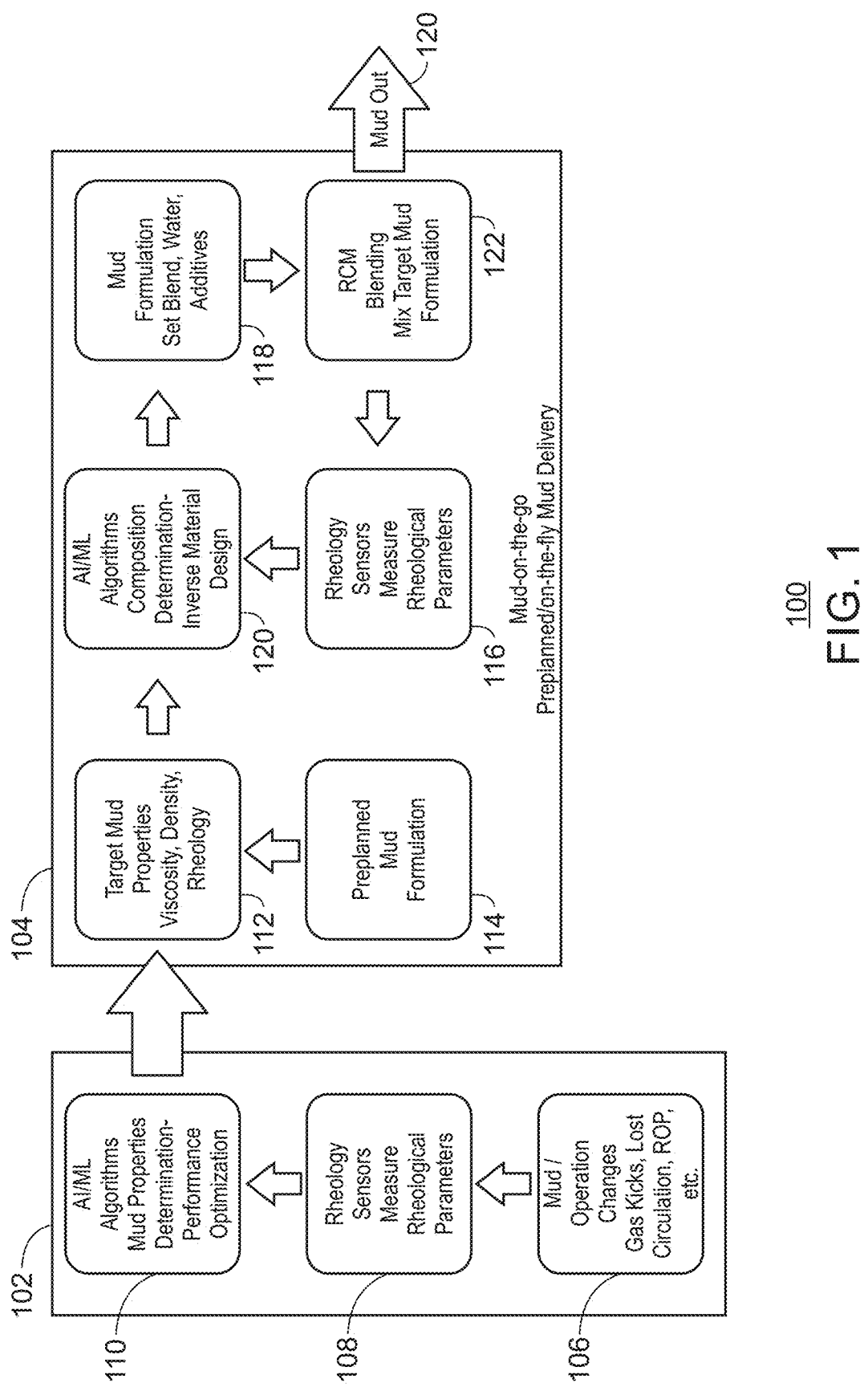
FIG. 1 is a workflow illustrating sensing implementations, field and lab measurement types, empirical and machine learning models and predicted variables and properties.

Embodiments described herein enable machine learning based rig-site on-demand drilling mud characterization, property prediction, and optimization. In particular, the present techniques predict rheological properties. Generally, drilling mud is a heavy, viscous fluid mixture that is used in oil and gas drilling operations to carry rock cuttings to the surface and also to lubricate and cool the drill bit. The drilling mud, by hydrostatic pressure, also helps prevent the collapse of unstable strata into the borehole and the intrusion of water from water-bearing strata that may be encountered. Drilling muds can be water based (WBM) or oil based (OBM). In examples, water-based muds are used to drill conventional vertical wells at medium depths, whereas oil-based muds are used to drill at greater depths, or in directional or horizontal drilling, which place greater stress on the drilling components.

Drilling muds are composed of several materials. In examples, a water-based mud contains a clay such as bentonite to control viscosity that enables the mud to transport cutting chips to the surface. Additionally, a water-based mud contains minerals, such as barium sulfate to increase the weight of the column enough to stabilize the borehole. Other components of the drilling mud includes sodium hydroxide to increase alkalinity and decrease corrosion, salts such as potassium chloride to reduce infiltration of water from the drilling fluid into the rock formation, and various petroleum-derived drilling lubricants. In examples, an oil-based mud generally contains a brine, bentonite, and barite for viscosity and weight, and various emulsifiers and detergents for lubricity. Whether water based or oil based, drilling muds are used to transport cuttings, control fluid loss, and provide borehole support. The rheology of drilling fluids plays an important role in these aspects of drilling mud performance.

The present techniques predict sensor based rheological performance of drilling mud based on a relationship between the rheological properties and sensor responses from one or more sensors. The techniques described herein automate rig-site processes to improve the reliability, efficiency, and safety record at a rig site while drastically reducing non-productive time (NPT) at the rig site. It is of paramount importance to develop a robust technology that combines chemistry, sensor, artificial intelligence and machine learning to deliver a drilling mud formulation, in real time at the rig-site. In examples, generating a drilling mud formulation in real time at the rig-site is referred to as mud-on-the-go. To generate the drilling mud formulation in real time at the rig-site, the present techniques include a holistic approach that combines (1) Materials-mud-properties relationship, (2) Sensor-Mud-properties relationship and (3) Artificial intelligence and machine learning that enables characterization, property prediction and design optimization of fully formulated mud at the rig site on-demand.

FIG. 1 is an illustration of a workflow consisting of sensing implementations, field and lab measurement types, empirical and machine learning to models and predicted variables and properties. In embodiments, FIG. 1 outputs on-demand drilling mud characterization, property prediction, and optimization to enable mud formulated, in real time, at the well.

In the example of FIG. 1, a mud property block 102 and a mud composition block 104 are illustrated. As illustrated at block 110, AI/ML algorithms are used to predict rheological properties of drilling mud from compositional data based on a first empirical relationship across the compositional data, wherein the compositional data comprises multiple material mud properties. At block 106, mud/operation changes include gas kicks, lost circulation, ROP, and the like. The mud/operation changes are measured by rheology sensors at block 108. In some embodiments, the rheology sensors measure rheological parameters. The measured data is input to the AI/ML algorithms at block 110.

At the mud composition block 104, AI/ML algorithms 120 are used to predict sensor based rheological performance of drilling mud based on a second relationship between the predicted rheological properties of the drilling mud and sensor responses from one or more sensors, wherein sensor-based rheological performance includes a behavior of the drilling mud at the sensor responses. At block 112, target mud properties are determined from the AI/ML algorithms at block 110 and pre-planned mud formulations at block 114. The target mud properties at block 112 include viscosity, density, and rheology. The target mud properties at block 112 and rheology sensor data from block 116 are provided as input to the AI/ML algorithms 120. The AI/ML algorithms at block 120 output a predicted mud formulation 118. The AI/ML algorithms 120 can also output a predicted rheology behavior of the drilling mud. At block 122, rear camber mixing (RCM) blending is applied to mix a target mud formulation. The mud is output from a mixing tank, and rheology sensors at block 116 can capture data associated with the target mud formulation. Accordingly, the data associated with the blended mud formulation is provided as feedback to one or more sensors, wherein the feedback comprises the sensor based rheological performance, sensor responses, and a formulation associated with the drilling mud, wherein the feedback enables updating the formulation associated with the drilling mud.

In traditional techniques, drilling muds are designed and mixed based on trial and error laboratory intensive testing as well as human memory and intuitions leading to about 13-15% NPT, which costly downtime in addition to unsatisfactory reliability, efficiency and safety records.

As described with respect to FIG. 1, the present techniques establish a materials (additives)-mud-properties empirical relationship, sensor-mud-properties relationship, and builds artificial intelligence and machine learning network models based on the identified relationships. By contrast, traditional techniques are based on trial and error laboratory intensive testing as well as human memory and intuitions. The present techniques are automatic with artificial intelligence and machine learning capabilities for improved predictions and mud delivery as additional data is incorporated.

The block diagram of FIG. 1 is not intended to indicate that the workflow 100 is to include all of the components shown in FIG. 1. Rather, the workflow 100 can include fewer or additional components not illustrated in FIG. 1 (for example, additional models, sensor data, and the like). The workflow 100 may include any number of additional components not shown, depending on the details of the specific implementation. Furthermore, any of the functionalities of the workflow 100 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
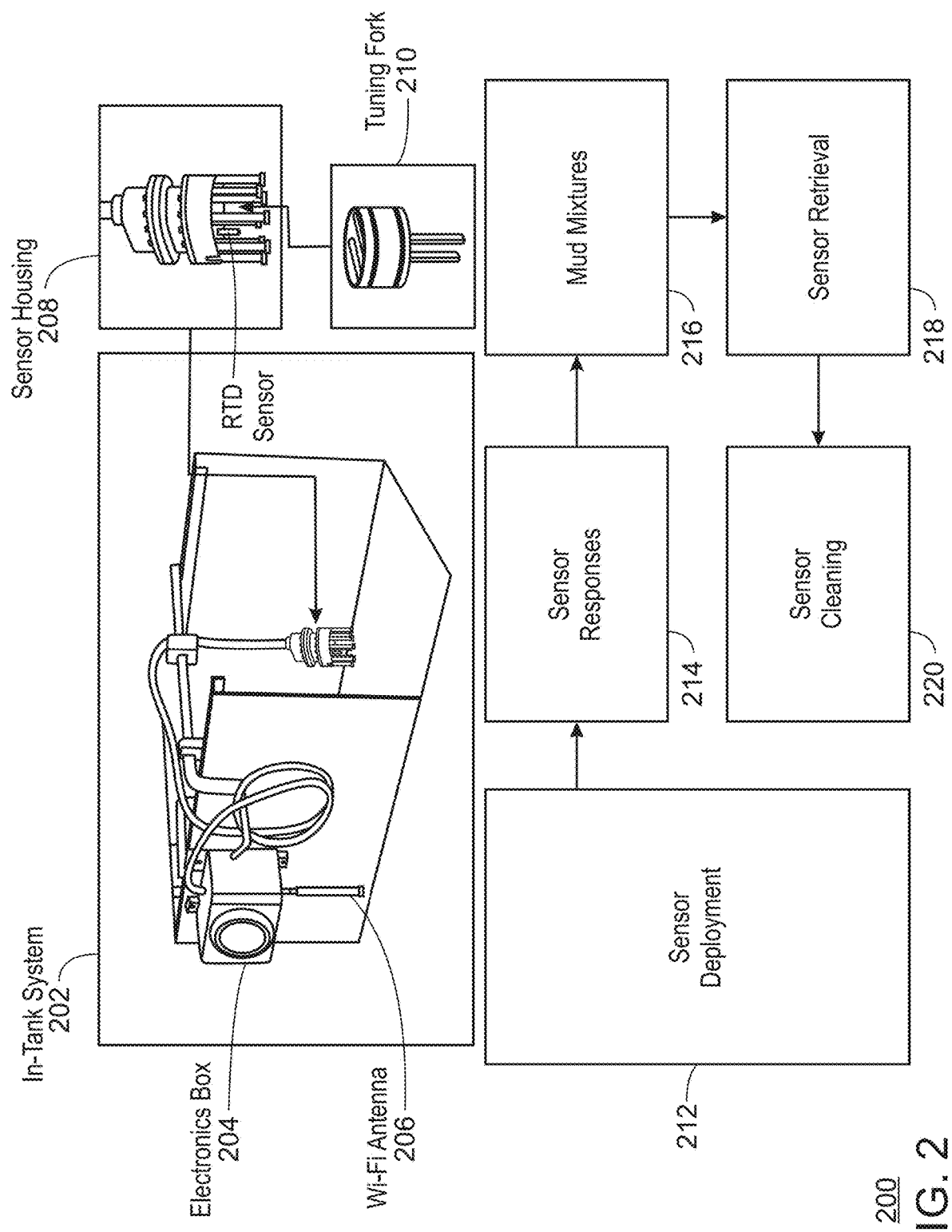
FIG. 2 is an illustration of exemplary rheological sensors and a rig-site measurement setup.

FIG. 2 is an illustration of exemplary rheological sensors and rig-site measurement setup. In the example of FIG. 2, a mixing tank system 202 is illustrated. In some embodiments, the mixing tank system 202 enables RCM blending as described at block 122 of FIG. 1. The mud is output from the mixing tank system 202. In tank sensors 208 may be, for example, rheology sensors that capture data and feedback as described at block 116 of FIG. 1. In some embodiments the sensors 208 include tuning forks 210 to tune the sensitivity of the sensors. An electronics box 204 provides electronics that drive and power the mixing tank system 202. A Wi-Fi antenna 206 provides components that enable the transmitting and receiving data at the mixing tank 202.

In the example of FIG. 2, a sensor workflow is illustrated. Sensor deployment 212 includes deploying sensors (such as rheology sensors described at block 122 of FIG. 1) where mud mixtures are generated, such as at the mixing tank system 202. The deployed sensors generate measurements 214 in response to the mud formulation 216. In some embodiments, sensor retrieval 218 retrieves sensors from the deployed locations. Sensor cleaning 220 cleans the retrieved sensors.

In embodiments, the materials-mud-properties relationship is an empirical relationship between mud properties like plastic viscosity, yield point, low shear yield point, gel strength, fluid loss control and weight percentage. The materials-mud-properties relationship is established based on laboratory measurements. In embodiments, data associated with a materials-mud-properties relationship and a sensor-mud-properties relationship are used to train a machine learning model that predicts rheological properties and temperature dependent performance of drilling mud samples. Generally, materials-mud-properties include important rheological properties of drilling mud from compositional data, including but not limited to shear yield stress, yield strain, flow point and the value at where $G'=G''$. The $G'$ refers to the elastic modulus, and reflects elastic behavior of a material when deformed. The $G''$ refers to the viscous modulus, which reflects the flow of a material while it is deformed.

In embodiments, the sensor-mud-properties relationship is a relationship between mud properties like plastic viscosity, yield point, low shear yield point, gel strength and a sensor response or one or more sensors. The sensor response is captured directly from sensor data or calculated indirectly. The sensor-mud-properties relationship is established based on laboratory measurements. In some examples, the sensor is a temperature sensor, and sensor-mud-properties include temperature dependent rheological performance of drilling mud from compositional data. The present techniques also include a sensor response feedback loop between a materials transfer system and a mixing tank.

The empirical relationships, compositional information, mixture properties and measurements of the materials from the materials-mud-properties relations and sensor-mud-properties relation are used to build artificial intelligence model for mud performance prediction and design optimization. Machine learning is adopted/adapted to capture future data to improve predictions made according to the present techniques.

To build the build artificial intelligence model and enable machine learning based prediction of rheological properties and prediction of temperature dependent performance of drilling mud samples, (1) rheological properties of drilling mud from compositional data are predicted. Next, (2) temperature dependent rheological performance of drilling mud from compositional data is predicted. The temperature dependent rheological performance of drilling mud is based on the predicted rheological properties of drilling mud from compositional data.

Figure 3:
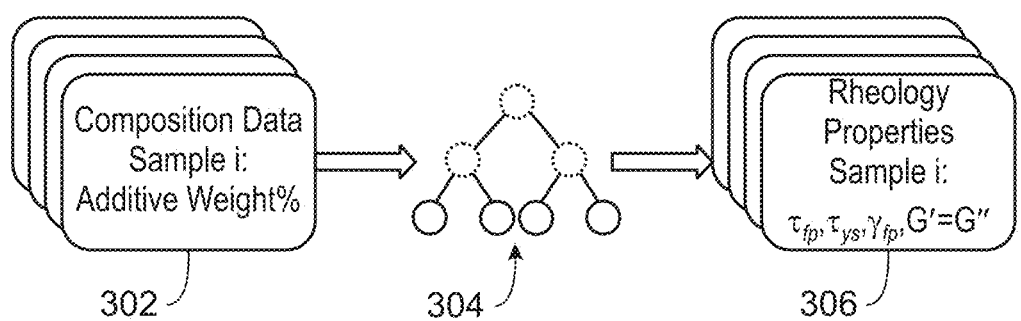
FIG. 3 is a block diagram for predicting rheology properties from composition data for a collection of drilling mud samples.

For the first prediction, rheological properties of drilling mud from compositional data are predicted, including but not limited to shear yield stress, yield strain, flow point and the value at where $G'=G''$. FIG. 3 is a block diagram for predicting rheology properties from composition data for a collection of drilling mud samples. In FIG. 3, composition samples 302 are input to a decision tree based machine learning model 304. Rheology properties sample output variables 306 include shear yield stress, yield strain, flow point and the value at where $G'=G''$. FIGS. 4A-4B are a chart illustrating example composition properties of several drilling mud samples, including water based (WBM) and oil based (OBM). In particular, FIGS. 4A-4B illustrate example compositional data (columns 402) for several drilling mud samples (rows 404), referred to as X (where X is the drilling mud composition in weight for different mud types, with each row corresponding to one mud type). FIG. 5 shows example target rheological properties of the same drilling mud samples, referred to as Y. The machine learning models predict Y (target rheological properties) from X (for example, FIGS. 4A-4B, drilling mud composition), and are trained from a training subset of the samples and then applied to the testing or new samples. Note that the compositional data X are first normalized by the total weight sum of each sample before being input into the model.

Generally, rheology properties have continuous numerical values and therefore can be trained using a number of regression models, including the regular linear and nonlinear regression, decision trees, random forest and extreme gradient boosting regression models (such as XGBoost). In the example of FIG. 3, the decision tree based machine learning model 304 is an XGBoost model. In some embodiments, an ensemble of regression trees are constructed, taking as input a subset of features (compositional elements such as those listed in the columns of FIGS. 4A-4B) to fit the target properties of a subset of mud samples, as listed in FIG. 5, to minimize for instance the mean square error between the predicted and true target property values. Trees are then added one at a time to the ensemble and fit to correct the prediction errors made by prior models, forming a type of ensemble machine learning model referred to as boosting. The training process then consists of adding a series of weak learner sub-models or more specifically decision trees. After calculating the loss, to perform the gradient descent procedure, a tree is added to the model that reduces the loss (i.e. follow the gradient). Parameterizing the tree and modifying the tree parameters reduces the residual loss.

FIG. 5 is a chart with exemplary target rheological properties of several drilling mud samples. In the example of FIG. 5, target rheological properties of several drilling mud samples are illustrated, including shear yield stress, yield strain, flow point and the value at where $G'=G''$. The target rheological properties can be predicted from the composition information of the associated mud samples (for example, FIGS. 4A-4B, drilling mud composition).

Figure 6:
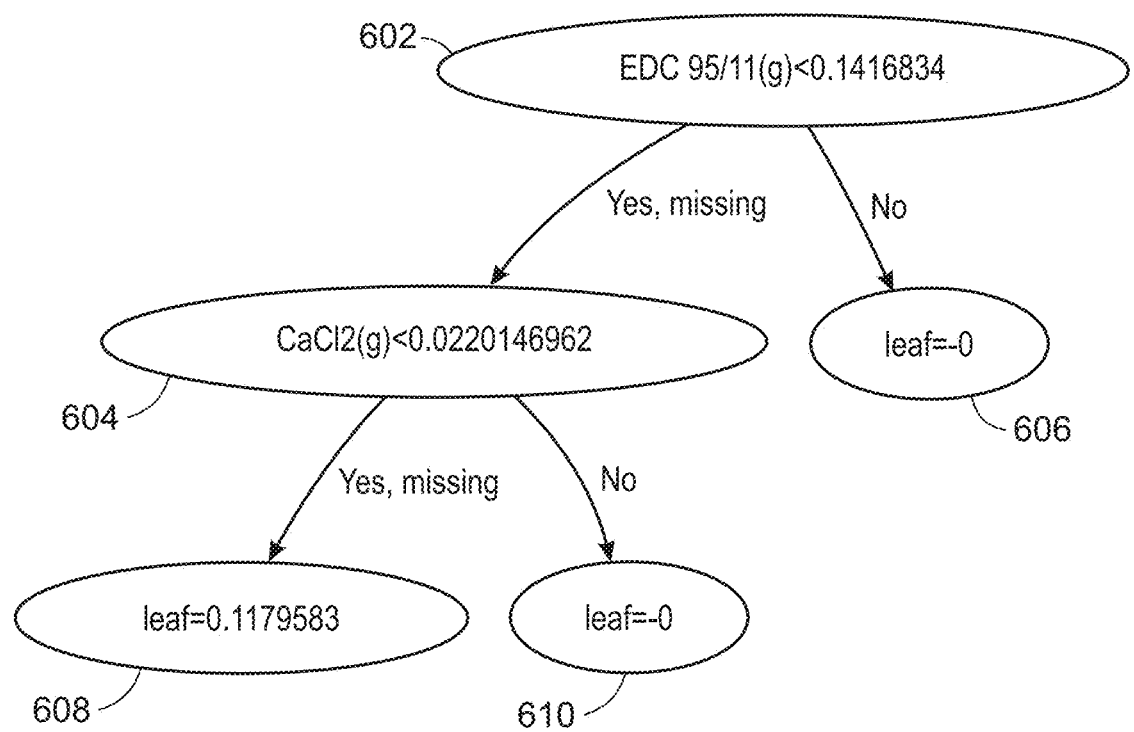
FIG. 6 is a trained ensemble tree from a trained gradient boosted model.

FIG. 6 is a trained ensemble tree from a trained gradient boosted model. Generally, the training process then consists of adding a series of weak learner sub-models or more specifically decision trees. After calculating the loss, to perform the gradient descent procedure, a tree is added to the model that reduces the loss (i.e. follow the gradient). Parameterizing the tree and modifying the tree parameters reduces the residual loss. In particular, trees are then added one at a time to the ensemble and fit to correct the prediction errors made by prior models, forming a type of ensemble machine learning model referred to as boosting. In examples, multiple trees are added in parallel.

In the example of FIG. 6, an example tree model 600 for the trained XGBoost algorithm for predicting flow point is provided. The ensemble tree 600 is a component of the trained XGBoost model applied to predict flow point yielding stress. A root node 602 includes an environmental drilling compound (EDC) $95/11(g)<0.1416834$, and is a root node that contains the variable which has the highest gain values as defined by Attribute Selective Measure (ASM), either through Gini Index or Information gain. In examples, the EDC is a type of oil-based mud, classified according to the base oil's aromatic content. A decision node 604 further divides the path into two more leaf (or terminal) nodes 608 and 610 corresponding to different values for predicting flow point yielding stress as illustrated. If the EDC is not greater than $0.1416834$, the path continues to leaf node 606, wherein the predicted flow point yielding stress is zero. The leaf nodes 608 and 610 are terminal nodes predicting an outcome (which in this case is the flow point yielding stress), and the values are different for different tree paths.

FIG. 7 is a chart illustrating k-fold cross-validation performance results for flow point prediction. FIG. 7 shows the training and testing performance of an XGBoosting model after 10-fold cross validation (such as the XGBoost model 304 of FIG. 3), which shows a small averaged root mean squared error (RMSE) as well as the standard deviation, for both training and testing, along the row 702. The column 704 represents an index for each one of the five different prediction models. In the example of FIG. 7, columns 0-4 represent regular linear and nonlinear regression, decision trees, random forest, and extreme gradient boosting (XGBoost) regression models. The variance of the testing performance overall increases significantly over that of training.

Figure 8A:
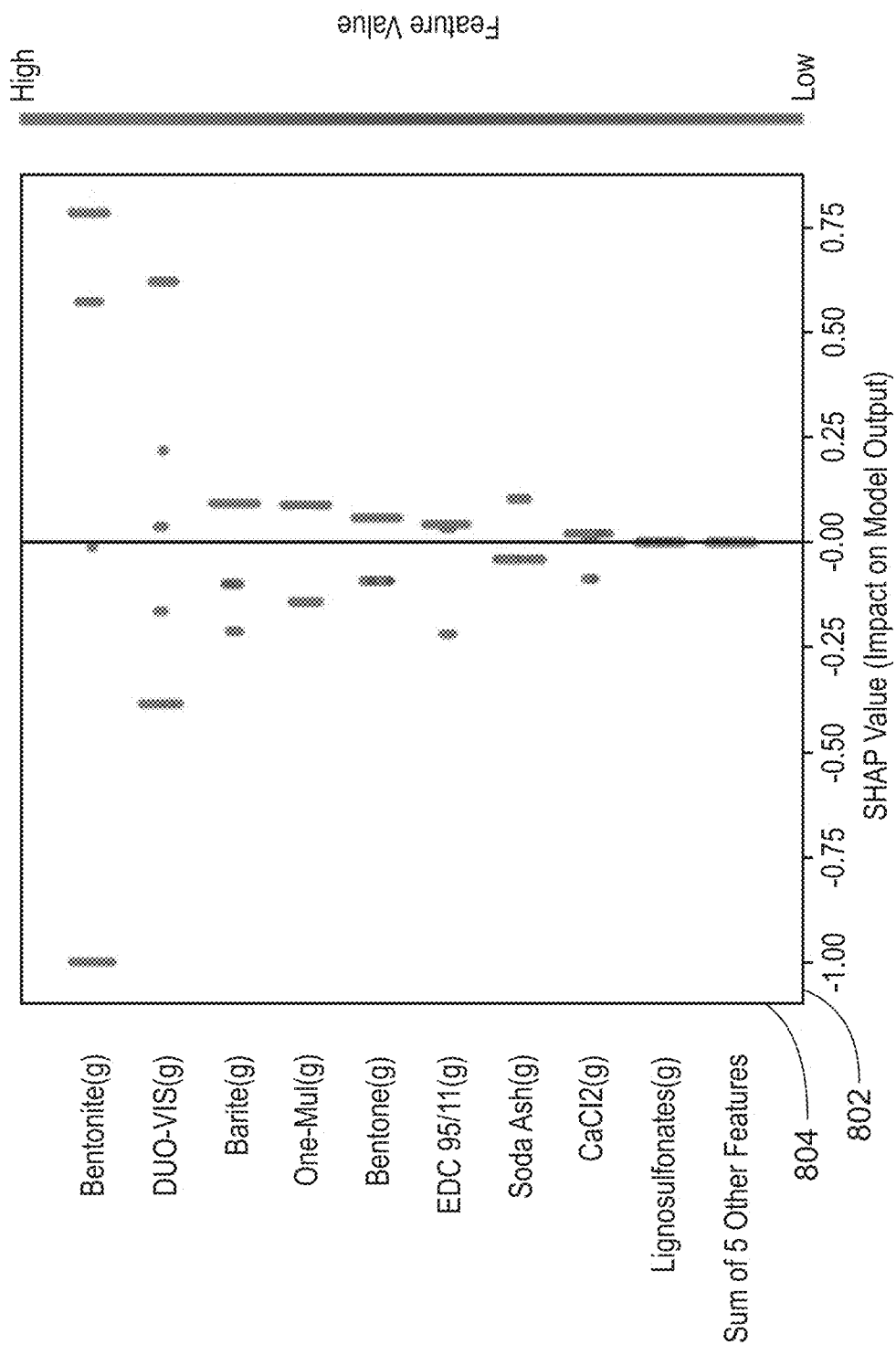
FIG. 8A is a feature importance ranking for flow point prediction.

FIG. 8A is a feature importance ranking 800A for flow point prediction. FIG. 8A provides a ranking of the relative importance of the compositional parameters in predicting the flow point yield stress level for the samples listed in FIG. 3. In the example of FIG. 8A, the ranking 800A it suggests that Bentonite, a biopolymer viscosifier (DUO-VIS), Barite, and a liquid emulsifier (One-Mul) have the dominant influence on flow point prediction. This information is then used in drilling mud additive recipe design or for rig-site drilling optimization.

Figure 9:
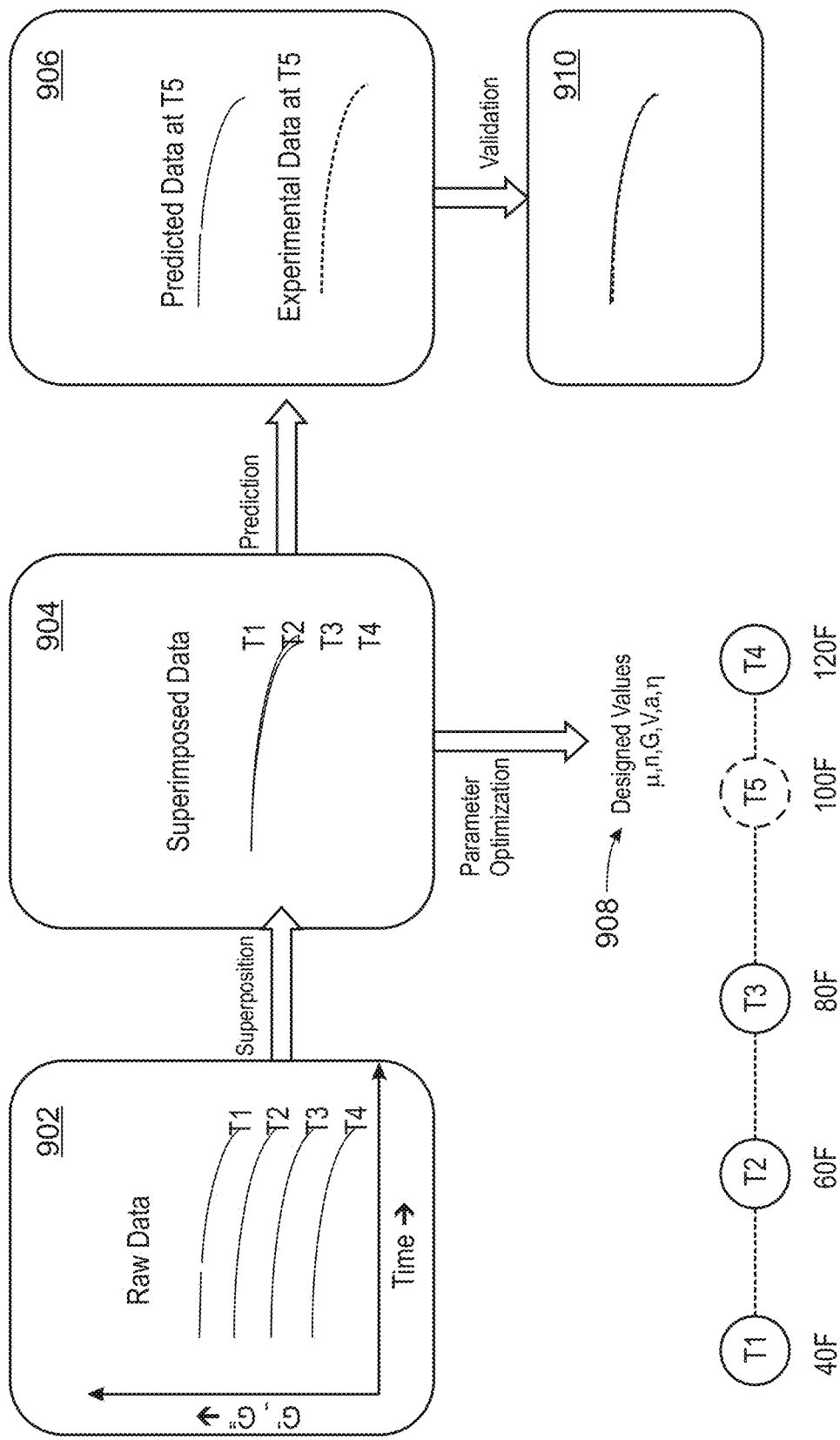
FIG. 9 is an illustration of prediction with time-temperature superposition.

Once the rheological properties of drilling mud from compositional data are predicted, temperature dependent rheological performance of drilling mud from compositional data is performed. In predicting rheological performance, more than single point rheology properties of drilling mud samples are predicted. The present techniques predict the shear stress vs. shear rate behavior as a function of temperature. These temperature sweeping measurements are measured in a lab setting for various mud additive compositions, or modeled via empirical models, as shown in FIG. 9. As a result, the target output is a table or matrix for each sample where the entries are yield stress as function of temperature (columns) and shear rate (rows).

Figure 8B:
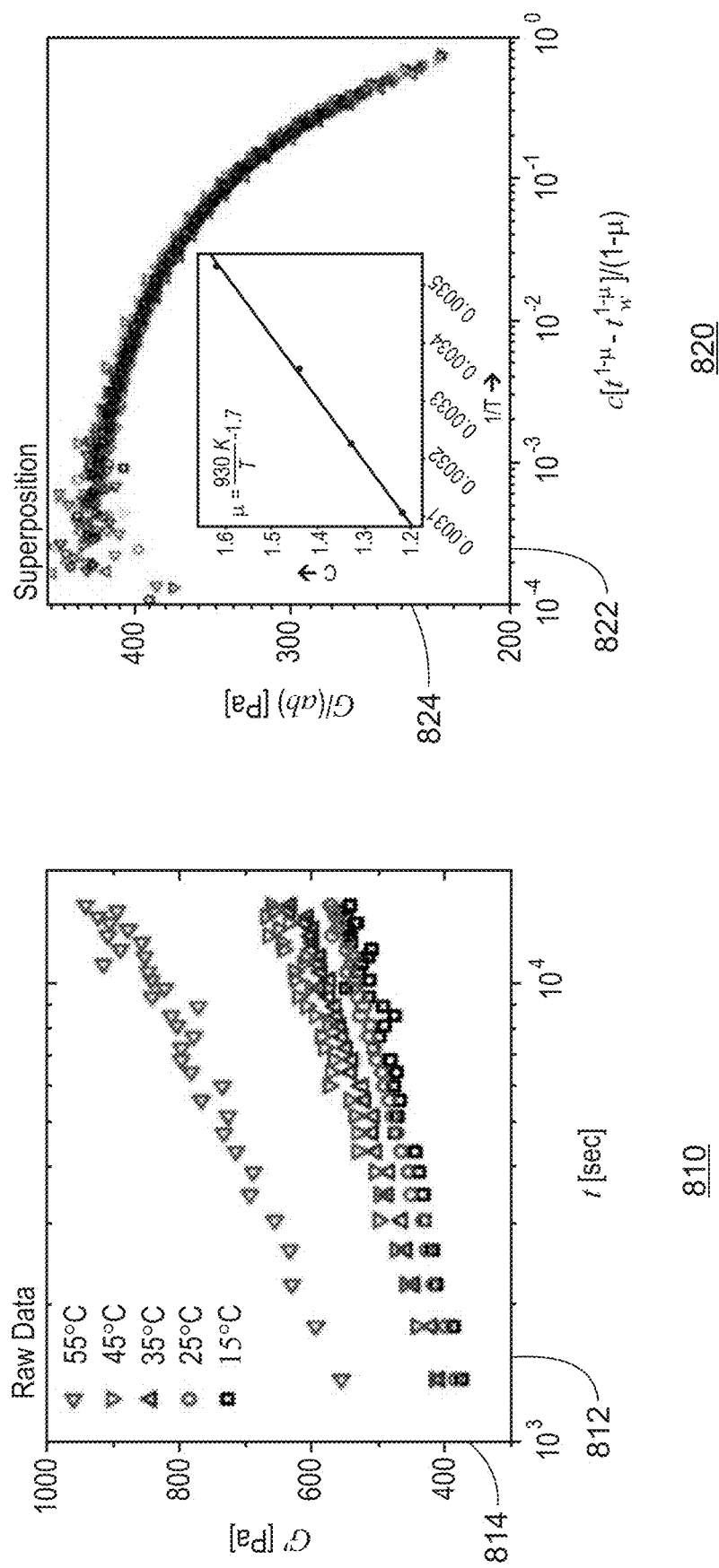
FIG. 8B is an illustration of exemplary extrapolation and interpolation of rheological behavior.

Prediction of temperature dependent rheological performance of drilling mud from compositional data is enabled via two approaches. The first approach to predicting temperature dependent rheological performance of drilling mud from compositional data includes extrapolation and interpretation. FIG. 8B is an illustration of extrapolation and interpolation of rheological behavior. In particular, extrapolation and interpolation of rheological behavior is enabled via parametrization. Raw data is provided at the chart 810, with time represented on the x-axis 812 and G' represented on the y-axis 814. Superimposed data is provided at the chart 820, with $$c[t^{1-\mu} - t_w^{1-\mu}]/1-\mu$$

represented on the x-axis 822 and G represented on the y-axis 824. In embodiments, similar superposition of shear rate-temperature and concentration—temperature can be obtained. FIG. 9 is an illustration of prediction with time-temperature superposition. The extrapolation and interpolation of rheological behavior is converted into single vector via time-temperature superposition as in FIG. 9. Thus, FIG. 9 shows a drilling mud composition used to make a temperature dependent rheology performance prediction.

In the example of FIG. 9, raw data is obtained at block 902. The raw data is superimposed with temperature data at block 904. Data is predicted at block 908. The superimposed data from block 904 is input to parameter optimization, and optimized values 908 are output. Additionally, at block 910 validation occurs. Vector regression is used to predict the rheological performance of drilling mud at a particular target temperature, using blocks 902, 904, 906, and 910 of FIG. 9. Generally, in the example of FIG. 9 rheology behavior is predicted in terms of temperature curves, in addition to the shear yield stress, yield strain, flow point, from drilling mud compositional data. However, instead of trying to predict each one of the curves at different temperature, a model is trained to predict a superimposed temperature curve behavior. The superimposed temperature curve behavior can then be applied to predict the temperature curves based on a different composition.

The second approach to predicting temperature dependent rheological performance of drilling mud from compositional data includes represent data as a matrix. In particular, the temperature dependent rheology behavior is represented as a matrix which is then predicted directly via fully connected or convoluted neural network (CNN), depending on the size of the data. When the number of temperature samples or the shear rate conditions are large, generating a large matrix or image, then a CNN model can be applied to reduce the complexity. For a small target data size, a fully connected network can be sufficient.

Figure 10A:
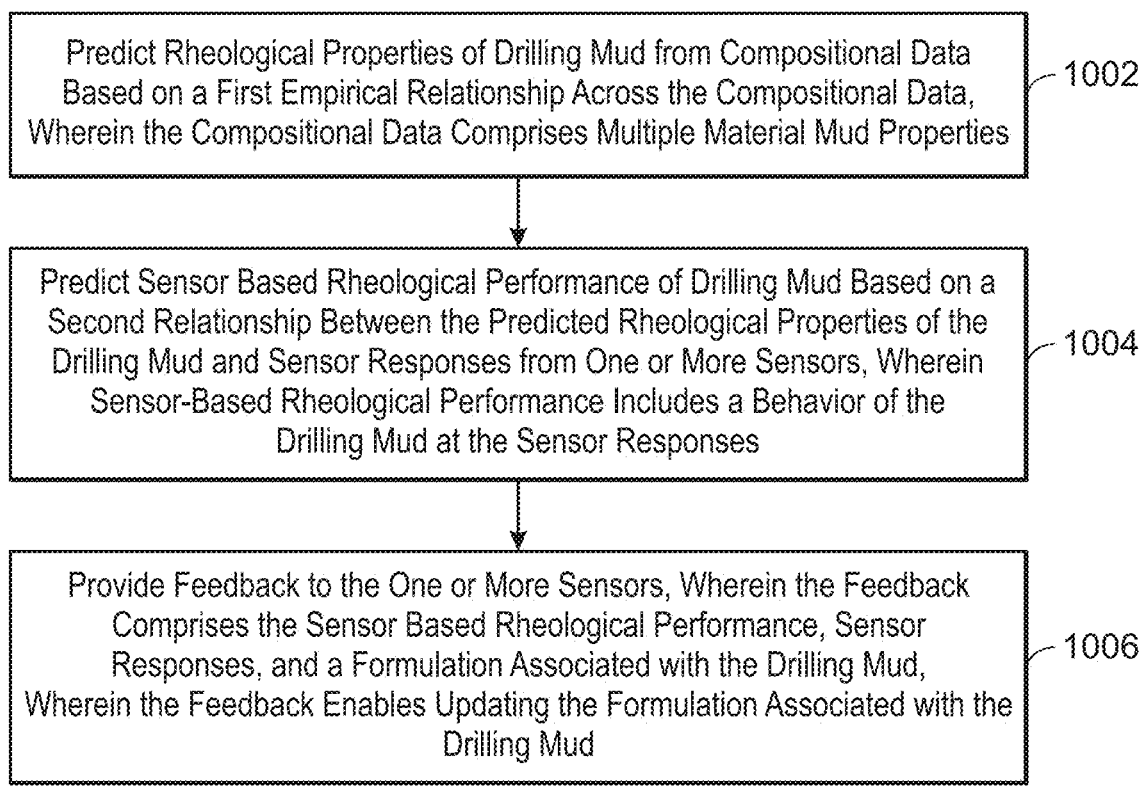
FIG. 10A is a process flow diagram of a process for machine-learning based rig-site on-demand drilling mud characterization, property prediction, and optimization.

FIG. 10A is a process flow diagram of a process 1000A for machine-learning based rig-site on-demand drilling mud characterization, property prediction, and optimization. The process 1000A may include the workflow 100 of FIG. 1. In embodiments, the process 1000A is implemented using the controller 1100 of FIG. 11.

At block 1002, rheological properties of drilling mud are predicted from compositional data based on a first empirical relationship across the compositional data, wherein the compositional data comprises multiple material mud properties. At block 1004, sensor based rheological performance of drilling mud is predicted based on a second relationship between the predicted rheological properties of the drilling mud and sensor responses from one or more sensors, wherein sensor-based rheological performance includes a behavior of the drilling mud at the sensor responses. At block 1006, feedback is provided to the one or more sensors, wherein the feedback comprises the sensor based rheological performance, sensor responses, and a formulation associated with the drilling mud, wherein the feedback enables updating the formulation associated with the drilling mud.

The process flow diagram of FIG. 10A is not intended to indicate that the process 1000A is to include all of the steps shown in FIG. 10A. Rather, the process 1000A can include fewer or additional components not illustrated in FIG. 10A (for example, additional predictions, sensors, properties, and the like). The process 1000A of FIG. 10A may include any number of additional components not shown, depending on the details of the specific implementation.

Figure 10B:
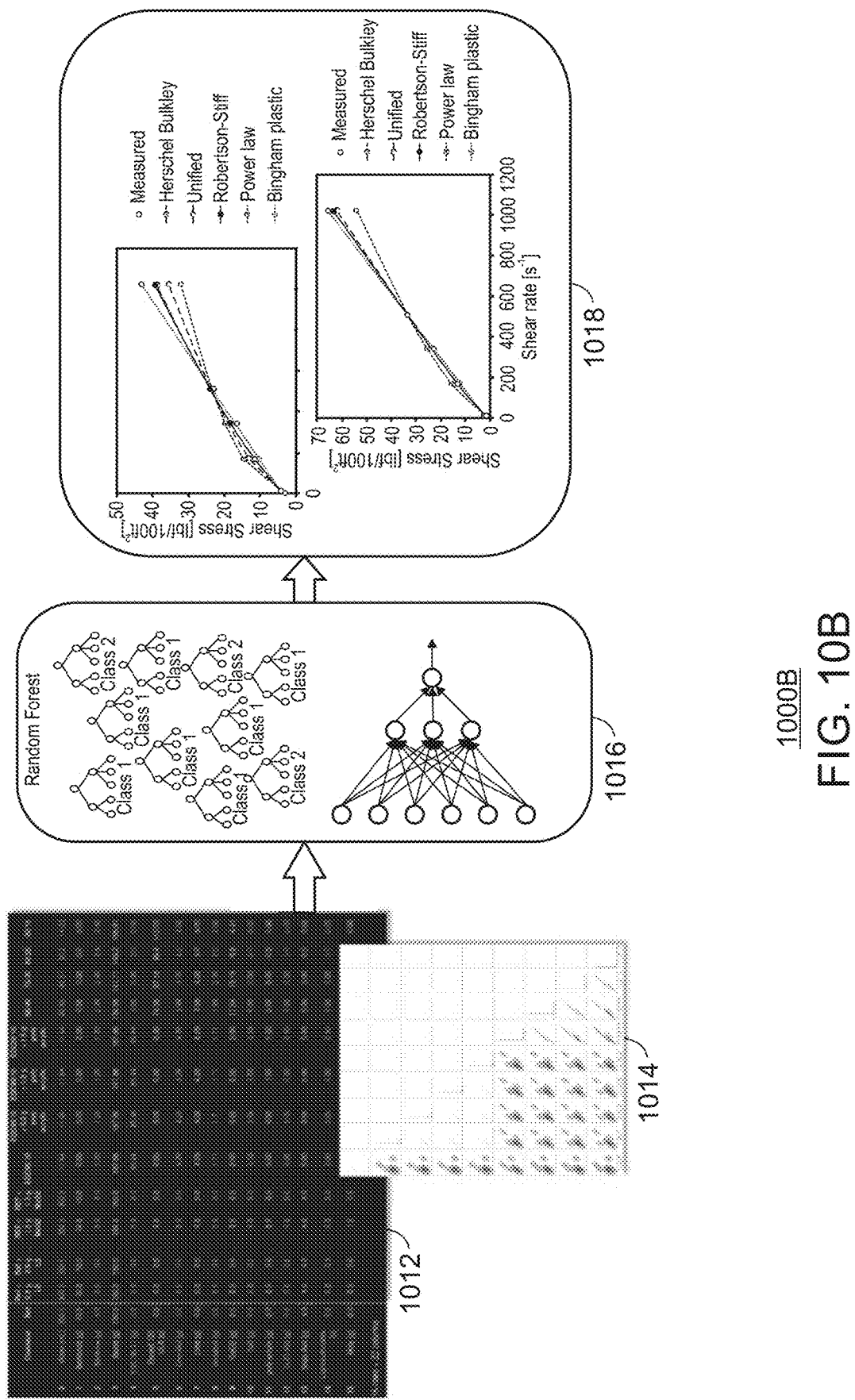
FIG. 10B is an illustration of a block diagram for machine-learning based rig-site on-demand drilling mud characterization, property prediction, and optimization.

FIG. 10B is an illustration of a block diagram 1000B for machine-learning based rig-site on-demand drilling mud characterization, property prediction, and optimization. The block diagram 1000B may include the workflow 100 of FIG. 1. In embodiments, the block diagram 1000B is implemented using the controller 1100 of FIG. 11.

In the example of FIG. 10B, materials-mud-properties 1012 and sensor mud properties 1014 are input into trained machine learning models 1016. The trained machine learning models 1016 output predictions 1018. In embodiments, the predictions 1018 are predicted mud characterizations or mud formulations, mud properties, and optimized mud formulations.

Figure 11:
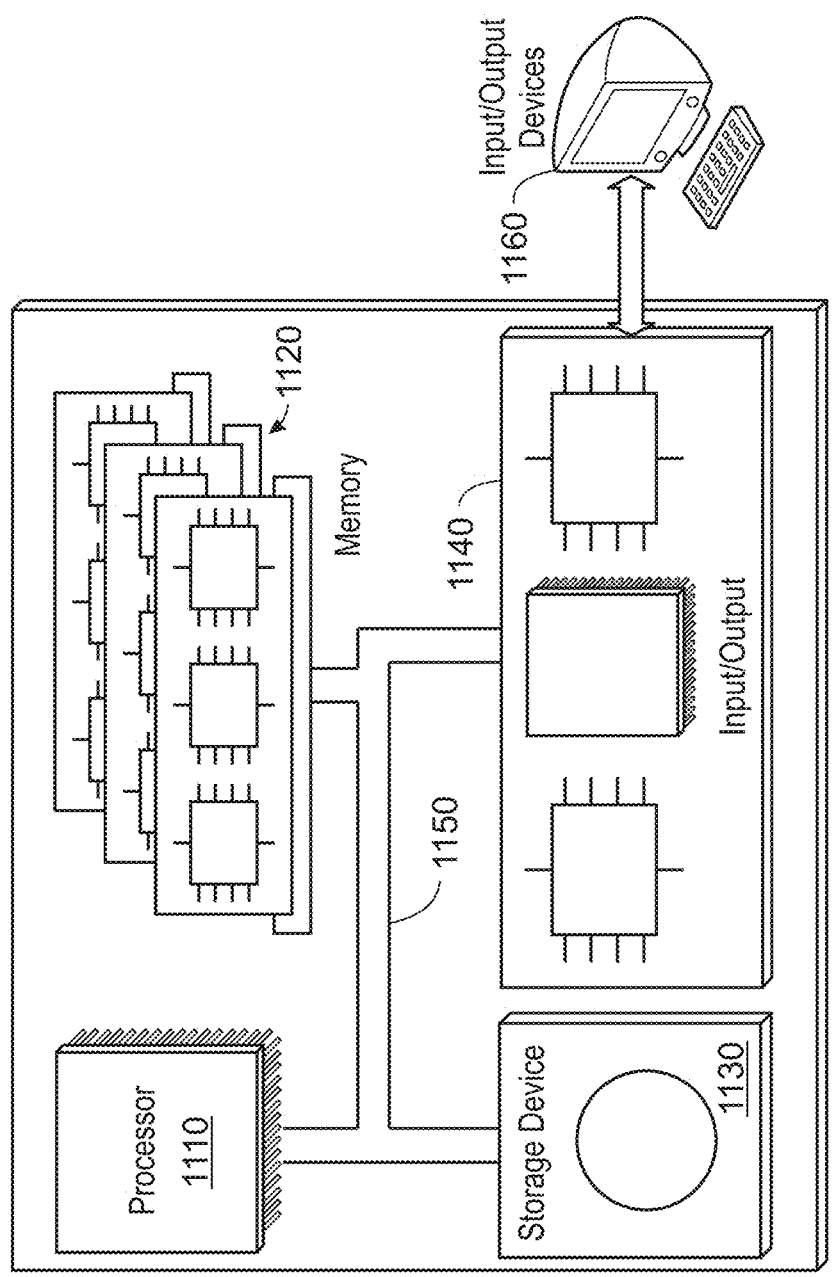
FIG. 11 is a schematic illustration of an example controller 1200 (or control system) for machine-learning based rig-site on-demand drilling mud characterization, property prediction, and optimization.

FIG. 11 is a schematic illustration of an example controller 1100 (or control system) for machine-learning based rig-site on-demand drilling mud characterization, property prediction, and optimization according to the present disclosure. For example, the controller 1100 may be operable according to the workflow 100 of FIG. 1 or the process 1100 of FIG. 11. The controller 1100 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 1100 includes a processor 1110, a memory 1120, a storage device 1130, and an input/output interface 1140 communicatively coupled with input/output devices 1160 (for example, displays, keyboards, measurement devices, sensors, valves, pumps). Each of the components 1110, 1120, 1130, and 1140 are interconnected using a system bus 1150. The processor 1110 is capable of processing instructions for execution within the controller 1100. The processor may be designed using any of a number of architectures. For example, the processor 1110 may be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output interface 1140.

The memory 1120 stores information within the controller 1100. In one implementation, the memory 1120 is a computer-readable medium. In one implementation, the memory 1120 is a volatile memory unit. In another implementation, the memory 1120 is a nonvolatile memory unit.

The storage device 1130 is capable of providing mass storage for the controller 1100. In one implementation, the storage device 1130 is a computer-readable medium. In various different implementations, the storage device 1130 may be a floppy disk device, a hard disk device, an optical disk device, or a tape device.

The input/output interface 1140 provides input/output operations for the controller 1100. In one implementation, the input/output devices 1160 includes a keyboard and/or pointing device. In another implementation, the input/output devices 1160 includes a display unit for displaying graphical user interfaces.

There can be any number of controllers 1100 associated with, or external to, a computer system containing controller 1100, with each controller 1100 communicating over a network. Further, the terms "client," "user," and other appropriate terminology can be used interchangeably, as appropriate, without departing from the scope of the present disclosure. Moreover, the present disclosure contemplates that many users can use one controller 1100 and one user can use multiple controllers 1100.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for machine learning based rig-site on-demand drilling mud characterization, property prediction and optimization, the method comprising:
   predicting, with one or more hardware processors, rheological properties of drilling mud from compositional data based on a first empirical relationship across the compositional data, wherein the compositional data comprises multiple material mud properties;
   predicting, with the one or more hardware processors, sensor based rheological performance of drilling mud based on a second relationship between the predicted rheological properties of the drilling mud and sensor responses from one or more sensors, wherein sensor-based rheological performance comprises a behavior of the drilling mud at the sensor responses; and
   providing, with the one or more hardware processors, feedback to the one or more sensors, wherein the feedback comprises the sensor based rheological performance, sensor responses, and a formulation associated with the drilling mud, wherein the feedback enables updating the formulation associated with the drilling mud.

2. The computer implemented method of claim 1, comprising transmitting the updated formulation to a mixing tank and applying the formulation at the mixing tank.

3. The computer-implemented method of claim 1, wherein predicting sensor based rheological performance of drilling mud from compositional data comprises
   extracting and interpolating rheological behavior of the drilling mud from the compositional data;
   converting the rheological behavior into a single vector using time-temperature superposition; and
   predicting the sensor based rheological performance using a gradient boosted decision tree, wherein the sensor based rheological performance comprises behavior of the drilling mud at the response of a sensor, wherein the response is temperature.

4. The computer-implemented method of claim 1, wherein predicting sensor based rheological performance of drilling mud from compositional data comprises:
   converting the rheological behavior of the drilling mud from the compositional data to a matrix;
   predicting the sensor based rheological performance using a fully connected neural network, wherein the sensor based rheological performance comprises behavior of the drilling mud at the response of a sensor, wherein the response is temperature.

5. The computer-implemented method of claim 1, wherein predicting sensor based rheological performance of drilling mud from compositional data comprises:
   converting the rheological behavior of the drilling mud from the compositional data to a matrix;
   predicting the sensor based rheological performance using a convolutional neural network, wherein the sensor based rheological performance comprises behavior of the drilling mud at the response of a sensor, wherein the response is temperature.

6. The computer implemented method of claim 1, wherein the multiple materials mud properties comprise plastic viscosity, shear yield stress, yield strain, flow point, yield point, low shear yield point, gel strength, fluid loss control and weight percentage, or any combinations thereof.

7. The computer implemented method of claim 1, wherein the sensor-based rheological performance comprises on-demand drilling mud characterization, mud property prediction, and optimization of drill mud formulation.

8. An apparatus comprising a non-transitory, computer readable, storage medium that stores instructions that, when executed by at least one processor, cause the at least one processor to perform operations comprising:
  predicting rheological properties of drilling mud from compositional data based on a first empirical relationship across the compositional data, wherein the compositional data comprises multiple material mud properties;
  predicting sensor based rheological performance of drilling mud based on a second relationship between the predicted rheological properties of the drilling mud and sensor responses from one or more sensors, wherein sensor-based rheological performance comprises a behavior of the drilling mud at the sensor responses; and
  providing feedback to the one or more sensors, wherein the feedback comprises the sensor based rheological performance, sensor responses, and a formulation associated with the drilling mud, wherein the feedback enables updating the formulation associated with the drilling mud.

9. The apparatus of claim 8, the operations comprising transmitting the updated formulation to a mixing tank and applying the formulation at the mixing tank.

10. The apparatus of claim 8, wherein predicting sensor based rheological performance of drilling mud from compositional data comprises:
  extracting and interpolating rheological behavior of the drilling mud from the compositional data;
  converting the rheological behavior into a single vector using time-temperature superposition; and
  predicting the sensor based rheological performance using a gradient boosted decision tree, wherein the sensor based rheological performance comprises behavior of the drilling mud at the response of a sensor, wherein the response is temperature.

11. The apparatus of claim 8, wherein predicting sensor based rheological performance of drilling mud from compositional data comprises:
  converting the rheological behavior of the drilling mud from the compositional data to a matrix;
  predicting the sensor based rheological performance using a fully connected neural network, wherein the sensor based rheological performance comprises behavior of the drilling mud at the response of a sensor, wherein the response is temperature.

12. The apparatus of claim 8, wherein predicting sensor based rheological performance of drilling mud from compositional data comprises:
  converting the rheological behavior of the drilling mud from the compositional data to a matrix;
  predicting the sensor based rheological performance using a convolutional neural network, wherein the sensor based rheological performance comprises behavior of the drilling mud at the response of a sensor, wherein the response is temperature.

13. The apparatus of claim 8, wherein the multiple materials mud properties comprise plastic viscosity, shear yield stress, yield strain, flow point, yield point, low shear yield point, gel strength, fluid loss control and weight percentage, or any combinations thereof.

14. The apparatus of claim 8, wherein the sensor-based rheological performance comprises on-demand drilling mud characterization, mud property prediction, and optimization of drill mud formulation.

15. A system, comprising:
  one or more memory modules;
  one or more hardware processors communicably coupled to the one or more memory modules, the one or more hardware processors configured to execute instructions stored on the one or more memory models to perform operations comprising:
  predicting rheological properties of drilling mud from compositional data based on a first empirical relationship across the compositional data, wherein the compositional data comprises multiple material mud properties;
  predicting sensor based rheological performance of drilling mud based on a second relationship between the predicted rheological properties of the drilling mud and sensor responses from one or more sensors, wherein sensor-based rheological performance comprises a behavior of the drilling mud at the sensor responses; and
  providing feedback to the one or more sensors, wherein the feedback comprises the sensor based rheological performance, sensor responses, and a formulation associated with the drilling mud, wherein the feedback enables updating the formulation associated with the drilling mud.

16. The system of claim 15, the operations comprising transmitting the updated formulation to a mixing tank and applying the formulation at the mixing tank.

17. The system of claim 15, wherein predicting sensor based rheological performance of drilling mud from compositional data comprises:
  extracting and interpolating rheological behavior of the drilling mud from the compositional data;
  converting the rheological behavior into a single vector using time-temperature superposition; and
  predicting the sensor based rheological performance using a gradient boosted decision tree, wherein the sensor based rheological performance comprises behavior of the drilling mud at the response of a sensor, wherein the response is temperature.

18. The system of claim 15, wherein predicting sensor based rheological performance of drilling mud from compositional data comprises:
  converting the rheological behavior of the drilling mud from the compositional data to a matrix;
  predicting the sensor based rheological performance using a fully connected neural network, wherein the sensor based rheological performance comprises behavior of the drilling mud at the response of a sensor, wherein the response is temperature.

19. The system of claim 15, wherein predicting sensor based rheological performance of drilling mud from compositional data comprises:
  converting the rheological behavior of the drilling mud from the compositional data to a matrix;
  predicting the sensor based rheological performance using a convolutional neural network, wherein the sensor based rheological performance comprises behavior of the drilling mud at the response of a sensor, wherein the response is temperature.

20. The system of claim 15, wherein the multiple materials mud properties comprise plastic viscosity, shear yield stress, yield strain, flow point, yield point, low shear yield point, gel strength, fluid loss control and weight percentage, or any combinations thereof.

* * * * *